United States Patent
Heo et al.

(10) Patent No.: US 6,272,277 B1
(45) Date of Patent: *Aug. 7, 2001

(54) OPTICAL FIBER FOR LIGHT AMPLIFIER

(75) Inventors: Jong Heo; Yong-Beom Shin, both of Pohang; Se-Ho Park, Seoul; Sun-tae Jung, Anyang; Hyoun-soo Kim, Sungnam, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/417,056

(22) Filed: Oct. 13, 1999

(30) Foreign Application Priority Data

Oct. 13, 1998 (KR) .................................. 98-42714

(51) Int. Cl.⁷ .................. G02B 6/00; G02B 6/02
(52) U.S. Cl. .................. 385/142; 385/123; 359/341; 501/37; 372/6
(58) Field of Search .................. 385/141, 142, 385/144, 123, 124; 372/6; 359/341, 342, 343; 501/78, 40, 37, 11, 50, 140, 152

(56) References Cited

U.S. PATENT DOCUMENTS

| | | |
|---|---|---|
| 5,351,335 | 9/1994 | Ohishi et al. . |
| 5,379,149 * | 1/1995 | Snitzer et al. .................. 359/341 |
| 6,148,125 * | 11/2000 | Hoe et al. .................. 385/31 |

FOREIGN PATENT DOCUMENTS

| | | |
|---|---|---|
| 0 775 674 A2 | 3/1995 | (EP) . |
| 6-342175 | 12/1994 | (JP) . |
| WO97/03028 | 1/1997 | (WO) . |
| WO98/01401 | 1/1998 | (WO) . |

* cited by examiner

Primary Examiner—Cassandra Spyrou
Assistant Examiner—Euncha Cherry
(74) Attorney, Agent, or Firm—Robert E. Bushnell, Esq.

(57) ABSTRACT

An optical fiber for use in a light amplifier. The optical fiber is formed by doping a germanium-gallium-sulfur (Ge—Ga—S) glass containing less sulfur than a $GeS_2$—$Ga_2S_3$ stoichiometric composition line with a rare earth element, and further contains 0.1~10 atomic % of a halogen element base on the Ge—Ga—S glass. By using optical fiber, clustering of praseodymium ($Pr^{+3}$) ions can be suppressed even when the concentration of added $Pr^{+3}$ is high, thereby improving light amplification efficiency.

21 Claims, 4 Drawing Sheets

OPTICAL FIBER FOR LIGHT AMPLIFIER

CLAIM OF PRIORITY

This application makes reference to, incorporates the same herein, and claims all benefits accruing under 35 U.S.C. §119 from an application for OPTICAL FIBER FOR LIGHT AMPLIFIER earlier filed in the Korean Industrial Property Office on Oct. 13, 1998 and there duly assigned Ser. No. 42714/1998.

BACKGROUND OF THE INVENTION

1. Field of the Invention

The present invention relates to optical fibers for use in a light amplifier, and more particularly, to an optical fiber for used in a light amplifier having an improved optical amplification efficiency.

2. Description of the Related Art

In general, in the manufacture of light amplifiers having a wavelength in the region of 1310 nm which is the zero dispersion wavelength of silica glass, neodymium ions ($Nd^+3$) and praseodymium ions ($Pr^{+3}$), which are used as rare earth elements, are implanted into the glass. However, using $Nd^{+3}$ causes the following problems.

In particular, the peak wavelength of fluorescence produced in the $^4F_{3/2} \rightarrow {}^4I_{13/2}$ transition, which occurs at a wavelength of 1.35 $\mu$m, is considerably removed from the zero dispersion wavelength. The intensity of fluorescence in the wavelength region of 1.3 $\mu$m is very weak compared to that of fluorescence emitted at other wavelength regions of 890 nm and 1064 nm in the $^4F_{3/2}$ level. Also, the optical gain at wavelengths lower than 1.3 $\mu$m is significantly lowered, due to excited state absorption (ESA) at the $^4F_{3/2}$ level.

In order to solve these problems, a method of using a fluoride-rich glass instead of silica glass as a base material has been suggested. However, this method does not achieve a great improvement in optical gain in the wavelength region of 1310 nm.

Meanwhile, in the case of using $Pr^{+3}$, which is a rare earth element for use in doping glass, fluorescence emitted during the $^1G_4 \rightarrow {}^3H_5$ transition can be used. Also, the transition probability at such levels is very high compared that at other levels, so that a high optical amplification efficiency is expected at the transition from $^1G_4$ to $^3H_5$ levels.

However, in the actual application of $Pr^{+3}$, the energy gap between the $^1G_4$ level and the $^3F_4$ level, which is immediately below the $^1G_4$ level, is as small as 3000 $cm^{-1}$. Thus, in the case of using an oxide glass having a high lattice vibration energy (>800 $cm^{-1}$), the probability of non-radiative transition of $Pr^{+3}$ excited to the $^1G_4$ level due to multiple lattice vibration relaxation is greatly increased, thus lowering optical amplification efficiency.

To solve this problem, U.S. Pat. No. 5,379,149, to Snitzer et al., entitled GLASS COMPOSITIONS HAVING LOW ENERGY PHONON SPECTRA AND LIGHT SOURCES FABRICATED THEREFROM, discloses a method of using a germanium-galium-sulfur (Ge—Ga—S) glass as a base material. The patent in particular describes sulfur rich germanium-gallium-sulfur compositions doped with rare earth ions. Here, the lattice vibration energy of the Ge—Ga—S glass is smaller than that of a conventional oxide glass or fluoride glass, so that an improvement in optical amplification efficiency at the wavelength region of 1310 is anticipated.

K. Wei, Ph.D. dissertation, "Synthesis and Characterization of Rare Earth Doped Chalcogenide Glasses" Rutgers University (1994), pp. 71–79, also describes Ge—Ga—S glasses with excess sulfur relative to the stoichiometric composition line of Ge—$S_2$—$Ga_3S_3$. Only sulfur rich compositions were studied because sulfur poor compositions were stated to be usually opaque. K. Wei has reported that when a Ge—S, As—S, or Ge—As(P,Sb)—S glass has a stoichiometric composition or contains more sulfur than in the stoichiometric composition, the degree of solubility of rare earth element with respect to such glass is no more than several hundreds of parts per million (ppm). Thus, in the case where excessive rare earth element is added, fine crystals are precipitated due to the clustering of rare earth ions, causing devitrification.

The described Ge—Ga—S glass compositions contain excessive sulfur (S) compared to the stoichiometric composition line of $GeS_2$—$Ga_3S_3$, as shown in a phase diagram of Ge—Ga—S. Also, in the case of using $Ge_{25}Ga_5S_{70}$ glass which is a typical example of the composition, the solubility of $Pr^{+3}$ is relatively high compared to a Ge—S, As—S, or Ge—As(P,Sb)—S glass which has been adopted by a conventional method. However, if a high concentration of $Pr^{+3}$ is added, the energy transfer rate between ions is markedly increased due to clustering of $Pr^{+3}$ ions, so that the fluorescence lifetime at the $^1G_4$ level is shortened, in addition to lowering the optical amplification efficiency.

SUMMARY OF THE INVENTION

It is therefore an object of the present invention to provide an improved glass composition for an optical amplifier.

It is also an object of the present invention to provide a optical amplifier glass composition in which the solubility of $Pr^{3+}$ ions is high.

It is a further object of the present invention to provide an optical amplifier glass composition in which the distribution of $Pr^{3+}$ ions is uniform.

It is a still further object to provide an optical amplifier glass which is stable to crystallization.

It is a yet further object to provide an optical amplifier glass in which the absorption band of the $Pr^{3+}$ ion is shifted to a shorter wavelength.

It is another object of the present invention is to provide an improved optical fiber for use in a light amplifier.

It is yet another object to provide an optical fiber whose optical amplification efficiency is improved by suppressing the clustering of $Pr^{+3}$ ions in the case of adding a high concentration of $Pr^{+3}$.

According to an aspect of the present invention, there is provided an optical fiber for use in a light amplifier, which is formed by doping a germanium-gallium-sulfur (Ge—Ga—S) glass containing less sulfur than a $GeS_2$—$Ga_2S_3$ stoichiometric composition line with a rare earth element or a transition metal, further comprising 0.1~10 atomic % of a halogen element based on the Ge—Ga—S glass.

Preferably, the amount of gallium is equal to or less than 10 mole-%, (or atom-%) and the amount of sulfur is less than 67 mole-%. If the content of Ga and S is outside the above ranges, the effect of increasing the optical amplification efficiency is negligible. Also, any rare earth element or a transition metal can be used without restrictions, and preferably, $Pr^{+3}$ is used as a rare earth element. The rare earth element may be implanted into the glass together with at least one of ytterbium (Yb), neodymium (Nd), holmium (Ho), erbium (Er), thulium (Tm), chromium (Cr) and manganese (Mn), thereby increasing optical amplification efficiency. In addition, light can be simultaneously amplified at multiple wavelength regions.

BRIEF DESCRIPTION OF THE DRAWINGS

A complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
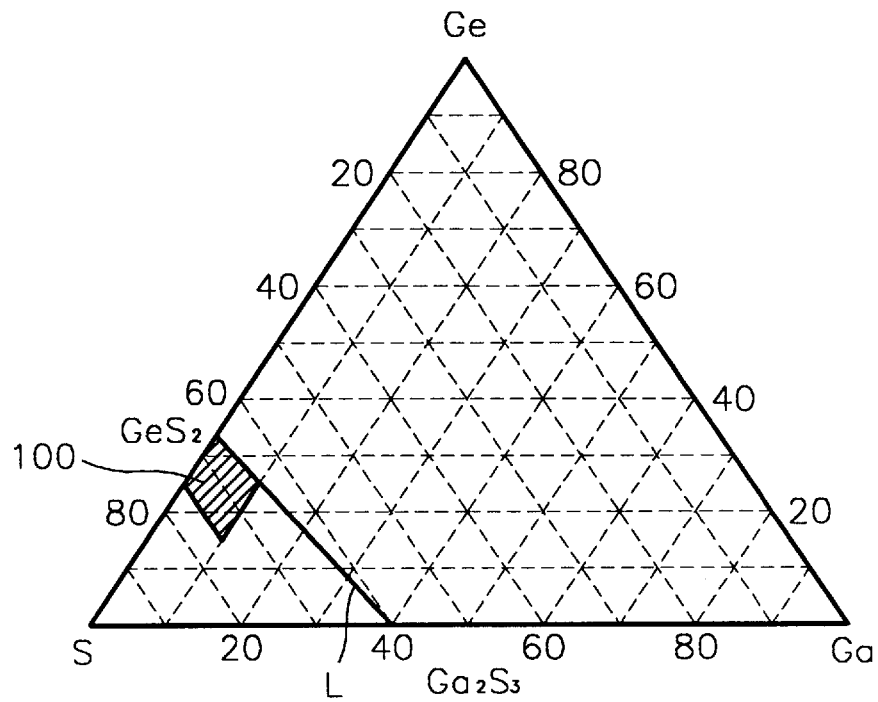
FIG. 1 is a phase diagram of germanium (Ge), gallium (Ga) and sulfur (S) in which a conventional class composition region is shaded.

Turning now to the drawings, FIG. 1 illustrates Ge—Ga—S compositions described in U.S. Pat. No. 5,379,149, as discussed above. A similar composition region was also described in the dissertation to Wei. As noted, the described Ge—Ga—S glass composition region 100 contains excessive sulfur (S) compared to the stoichiometric composition line L of $GeS_2$—$Ga_3S_3$, as shown in the phase diagram of Ge—Ga—S of FIG. 1.

Figure 3:
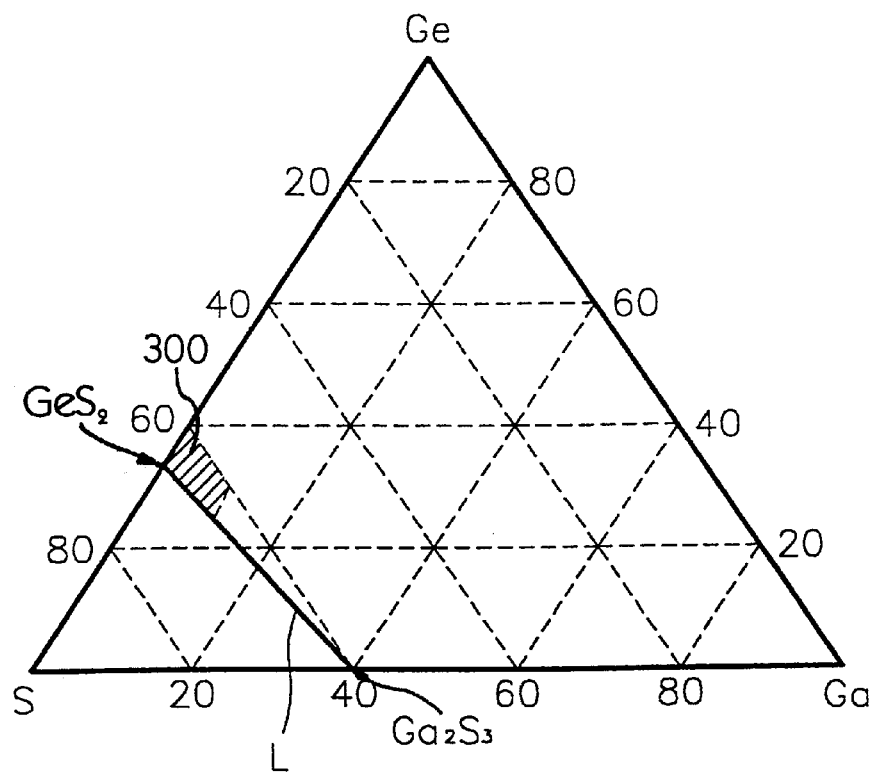
FIG. 3 is a phase diagram of Ge, Ga and S in which a glass composition region according to the present invention is shaded.

The present invention will now be described with reference to the drawings. The present invention is characterized in that the composition, as shown in region 300, of germanium-gallium-sulfur (Ge—Ga—S) glass is adjusted such that the sulfur (S) content is less than a $GeS_2$—$Ga_2S_3$ stoichiometric composition line L of FIG. 3. The stoichiometric composition line L is that obtained for mixtures of germanium sulfide and gallium sulfide, in which the mole fraction of sulfur is equal to 2 times the mole fraction of germanium plus 1.5 times the mole fraction of gallium. Compositions of the present invention therefore have a mole fraction of sulfur less than the mole fraction of sulfur in the corresponding mixture of germanium sulfide and gallium sulfide. Region 300 is further characterized in having a relative mole fraction of sulfur greater than approximately 60% and mole fraction of gallium less than approximately 10%. In the present invention a halogen element is further added to improve the capacity for forming glasses of a Ge—Ga—S compound.

Figure 2:
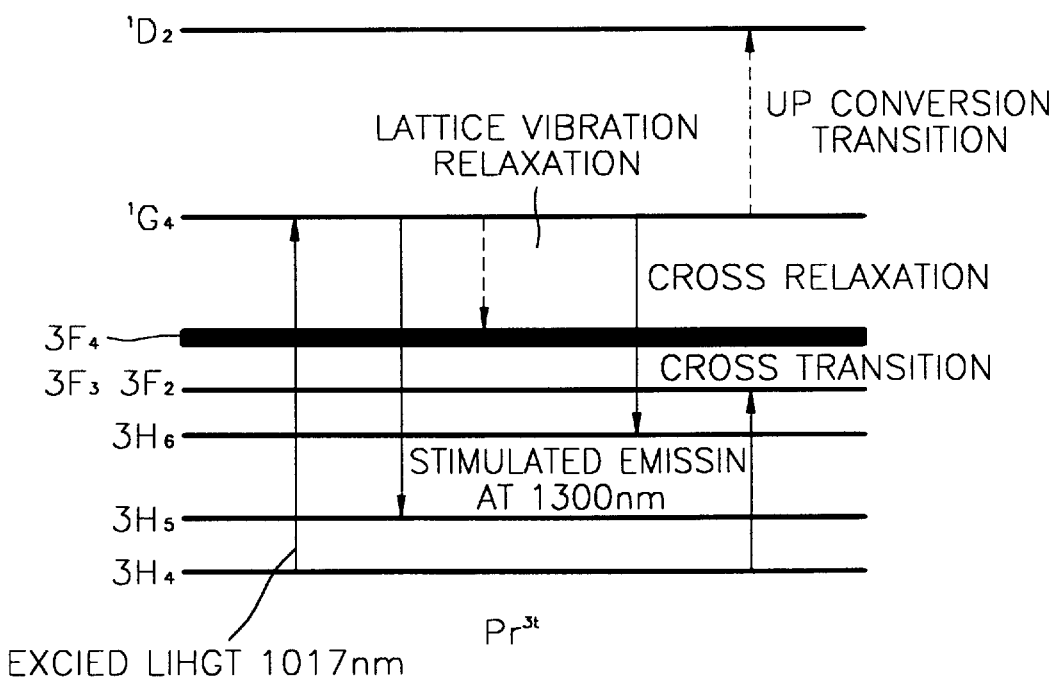
FIG. 2 is an energy level diagram of praseodymium ions ($Pr^{+3}$)

According to the principle of the present invention, a non-radiative transition of $Pr^{+3}$ excited at the $^1G_4$ level, where the excited $Pr^{+3}$ is radiated in a form other than in the form of light, acts as a critical factor which affects the fluorescence lifetime of $Pr^{+3}$ at the $^1G_4$ level and light amplification efficiency. The non-radiative transition of $Pr^{+3}$ is divided into multiple lattice vibration relaxation and energy transfer between $Pr^{+3}$ ions. Here, the multiple lattice vibration relaxation is caused by lattice vibration energy of glass, which occurs due to a small energy gap of about 3000 $cm^{-3}$ between the $^1G_4$ level, which is a metastable level, and the $^3F_4$ level, which is immediately below the $^1G_4$ level, as shown in FIG. 2.

In general, light amplification efficiency is lowered as the density of electrons of $Pr^{+3}$ at the $^1G_4$ level decreases. The reason for this, as shown in FIG. 2, is that $Pr^{+3}$ excited at the $^1G_4$ level absorbs the energy of other neighboring $Pr^{+3}$, so that $Pr^{+3}$ is transited up to the $^1D_2$ level (up-conversion transition) and $Pr^{+3}$ at the ground level of $^3H_4$ absorbs the energy of other neighboring $Pr^{+3}$ at the same level and is excited to the $^3F_2$ level (cross transition), and $Pr^{+3}$ excited at the $^1G_4$ level is transited to the $^3H_6$ level (cross relaxation). The energy transfer rate between $Pr^{+3}$ depends on the distance between ions. This relationship will be described under the assumption that the energy transfer mechanism between $Pr^{+3}$ is due to electrostatic interaction between $Pr^{+3}$ ions.

That is, the energy transfer rate is inversely proportional to the sixth power of the distance between ions in dipole-dipole interaction, to the eighth power of the distance between ions in dipole-quadruple interaction, and to the tenth power of the distance between ions in quadruple-quadruple interaction, respectively. Thus, the added $Pr^{+3}$ clusters together such that it is not evenly distributed, in the base, the energy transfer rate between ions is very high compared to the assumed state where $Pr^{+3}$ is evenly distributed. As a result, the light amplification efficiency is markedly lowered. Also, in order to evenly distribute $Pr^{+3}$ in the base, a limit of employing $Pr^{+3}$ in the glass base must be high.

As noted above, the dissertation of K. Wei has reported that when a Ge—S, As—S, or Ge—As(P,Sb)—S glass has a stoichiometric composition or contains more sulfur than in the stoichiometric composition, the degree of solubility of rare earth element with respect to such glass is no more than several hundreds of parts per million (ppm). Thus, in the case where excessive rare earth element is added, fine crystals are precipitated due to the clustering of rare earth ions, causing devitrification.

Conversely, in the case where a Ge—S, As—S or Ge—As (P, Sb)—S glass contains less sulfur than in the stoichiometric composition, the degree of solubility of rare earth element increases to several thousands of parts per million. Thus, it can be understood that the content of sulfur and the structure of glass are closely associated with each other. That is, when the content of sulfur is less than in the stoichiometric composition, metallic bonds exist between positive ions, which act as a critical factor capable of increasing the solubility of rare earth ions.

The present invention is to improve light amplification efficiency by reducing the non-radiative transition probability due to the energy transfer between ions, by making distribution of $Pr^{+3}$ ions in a Ge—Ga—S glass as uniform as possible. However, when a Ge—Ga—S glass contains less sulfur than in the stoichiometric composition, the following problems may occur.

First, metallic bonds between positive ions move a transmission threshold wavelength of the glass to the near infrared region of the spectrum, so that the wavelength of a source of light excitation can be absorbed by the base glass itself or the base material may be damaged by the absorption of the source of light excitation. Second, so the amount of sulfur decreases, the glass forming capacity decreases.

In order to prevent the above problems, a halogen element is added to the Ge—Ga—S glass in the present invention. Preferably, the halogen element is bromide (Br) or iodide (I). When Br or I is added, a Ge—Ga—S—Br or Ge—Ga—

S—I glass can be obtained. Adding such a halogen element is favorable in stabilizing the crystallization of a Ge—Ga—S glass and in that an absorption band is shifted to a short blue wavelength region.

Also, preferably, the halogen element is added in the amount of 0.1–10 atomic % based on the Ge—Ga—S glass. If the content of halogen element exceeds 10 atomic %, light amplification efficiency is lowered. Conversely, if the content of halogen element is less than 0.1 atomic %, glass forming capacity is undesirably lowered.

Figure 4:
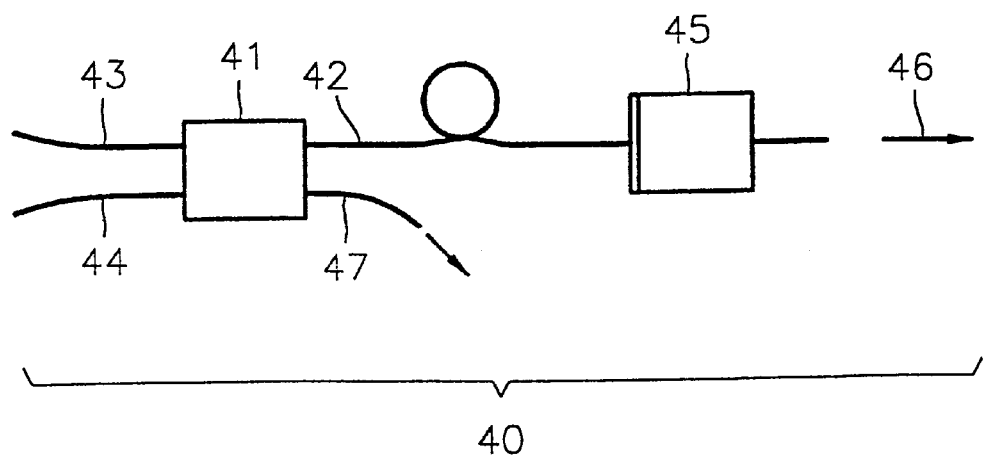
FIG. 4 is a schematic view showing the structure of a general light amplifier.

The glass of the present invention may be doped with a rare earth element or a transition metal. Hereinafter, a light amplifier adopting an optical fiber which is formed by doping a Ge—Ga—S—Br glass with $Pr^{+3}$ according to a preferred embodiment of the present invention, will be described with reference to FIG. 4. Referring to FIG. 4, a light amplifier 40 comprises a dispersive coupler 41 for coupling the pump radiation in an optical fiber 43 with the radiation from an optical fiber 44, an for optical fiber 42 formed by doping a Ge—Ga—S—Br glass with $Pr+^3$, and a Faraday isolator 45 for preventing backward reflection. Here, the dispersive coupler 41 couples approximately 90% of the radiation in the optical fibers 43 and 44 into the optical fiber 42 and the remaining 10% thereof into an optical fiber 47 for monitoring purposes. The light amplifier 40 having the above structure radiates a final light 46 which is amplified at a wavelength of 1310 nm.

The optical fiber according to the present invention can be applied over a light generating device such as a laser resonator and a superluminescent device. In the present invention, the term "fiber" is not limited to thin fibers, but encompasses shapes with a wide range of diameters.

Hereinafter, examples of the present invention will be described in detail. However, these examples are merely illustrative and the present invention is not limited to thereto.

EXAMPLE

A $Ge_{32}Ga_5S_{62.5}$ substrate and a $Ge_{28.3}Ga_{10}S_{61.7}$ substrate were prepared using Ge, Ga and S having a purity of 99.999% or more. Here, 5000 ppm of $Pr^{+3}$, and 5 atomic % of bromide (Br) were added based on the $Ge_{32}Ga_5S_{62.5}$ substrate or the $Ge_{28.3}Ga_{10}S_{61.7}$ substrate.

The resultant was weighed, wherein the batch size was 10 g, in a glove box filled with high purity argon (Ar) gas, and loaded into a silica glass ampule. Then, the ampule was sealed off under vacuum, and the resultant was kept in a rocking furnace at 950° C. for 12 hours and then quenched in air. The resultant structure was heated at a temperature near the glass transition temperature, resulting in optical fibers.

COMPARATIVE EXAMPLE

Optical fibers were manufactured in the same manner as in Example except that a $Ge_{25}Ga_5S_{70}$ was used instead of the $Ge_{32}Ga_5S_{62.5}$ substrate and the $Ge_{28.3}Ga_{10}S_{61.7}$ substrate, and Br was not added The stimulated emission cross-section in a wavelength region of 1310 nm and the fluorescence lifetime of $Pr^{+3}$ at the $^1G_4$ level were measured for the optical fibers manufactured in the Example and the Comparative Example. The results are shown in TABLE 1.

The fluorescence lifetime (τ: measured value), which is defined as the point in time at which the fluorescence intensity reaches 1/e of the initial level, was measured using a digitized oscilloscope, and the fluorescence lifetime ($τ_R$: calculated value) is defined as the point in time at which the fluorescence intensity reaches 1/e of the initial level under the assumption that only radiative transition by electron transition occurred. Also, quantum efficiency (η) was defined as the ratio of the measured and calculated fluorescence lifetimes.

Here, an $Ar^{+1}$ laser-driven titanium (Ti)-sapphire laser having a wavelength of 1020 nm, was used as a source of light excitation, and $Pr^{+3}$ was excited to the $^1G_4$ level using the light source. Then, the generated fluorescence was screened by wavelength using a 1/4 m double monochromater, and detected using an InGaAs PIN photodetector. Also, the detected fluorescence was analyzed using a lock-in amplifier connected to a computer.

TABLE 1

| Example | τ(μs) | η(%) | $τ_R$(μs) |
|---|---|---|---|
| Example | 160 | 31 | 507 |
| Comparative Example | 123 | 16 | 783 |

As shown in TABLE 1, the fluorescence lifetime of $Pr^{+3}$ at the $^1G_4$ level in the Comparative Example was 123 μs and the quantum efficiency thereof was 16%. However, the fluorescence lifetime of $Pr^{+3}$ at the $^1G_4$ level in the Example was increased to 160 μs and the quantum efficiency thereof was increased 31% in contrast to the Comparative Example.

From the above result, it was concluded that clustering of $Pr^{+3}$ ions is suppressed as the content of sulfur decreases at the same concentration of $Pr^{+3}$, so that non-radiative transition by the energy transfer between ions decreases.

Also, when designing a light amplifier or laser resonator, the threshold level of a source of flight excitation is very important. In general, the threshold level of the light source is inversely proportional to the product of fluorescence lifetime by the stimulated emission cross-section.

Figure 5:
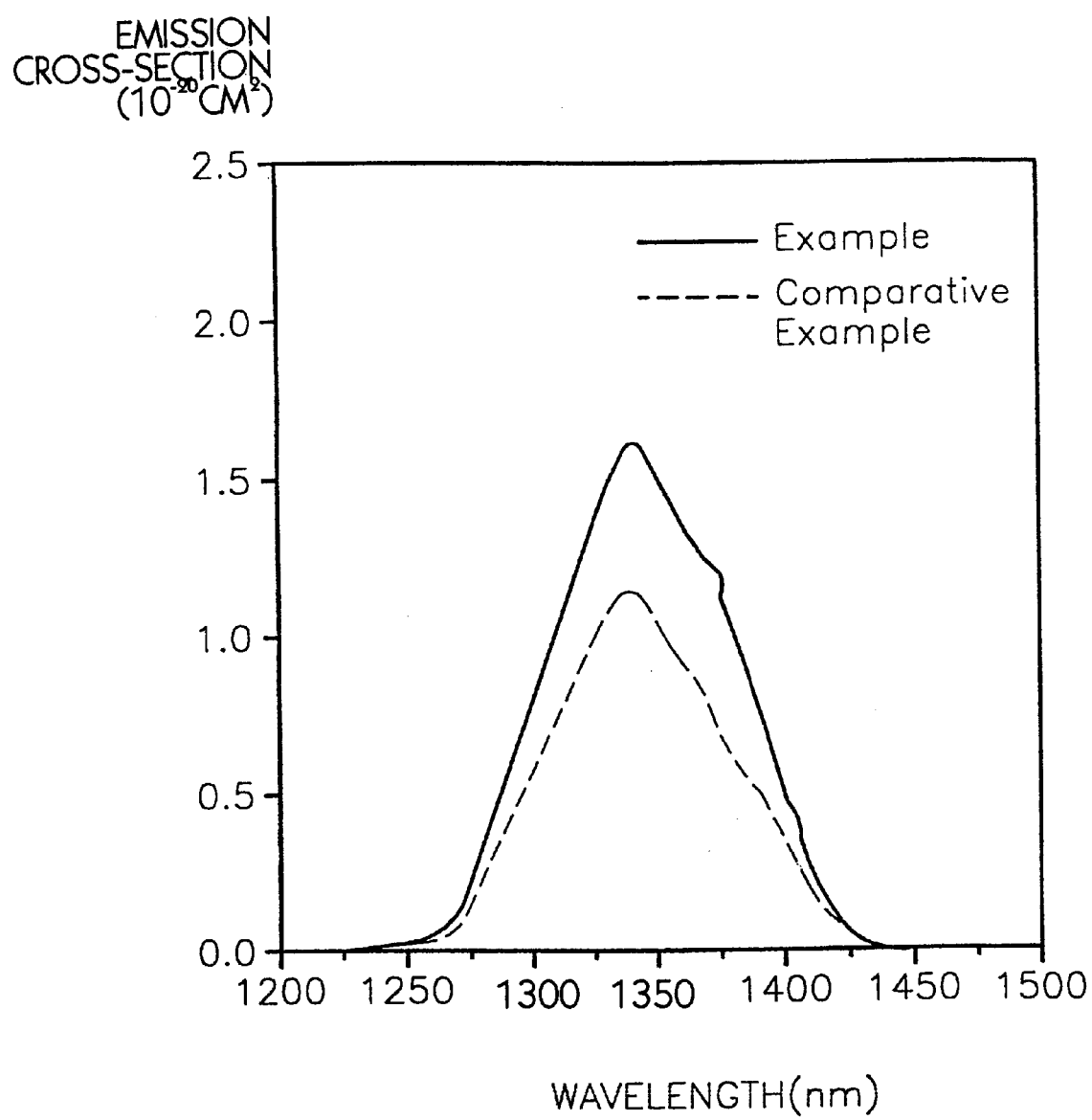
FIG. 5 is a graph showing the stimulated emission cross-section of optical fibers manufactured in an Example and a Comparative Example, with respect to wavelength.

Referring to FIG. 5, the stimulated emission cross-section at 1.3 μm was $9.92 \times 10^{-21}$ $cm^2$ in the Example, which was larger than that of $6.78 \times 10^{-21}$ $cm^2$ in the Comparative Example. The reason for this is believed to be that the probability of the $^1G_4 \rightarrow {}^3H_5$, transitions increases in glass containing insufficient sulfur.

As can be inferred from the result, when the sulfur content in a Ge—Ga—S glass decreases compared to the stoichiometric composition, both the fluorescence lifetime of $Pr^{+3}$ at the $^1G_4$ level and the stimulated emission cross-section at 1.31 μm increases, thereby improving light amplification efficiency.

Figure 6:
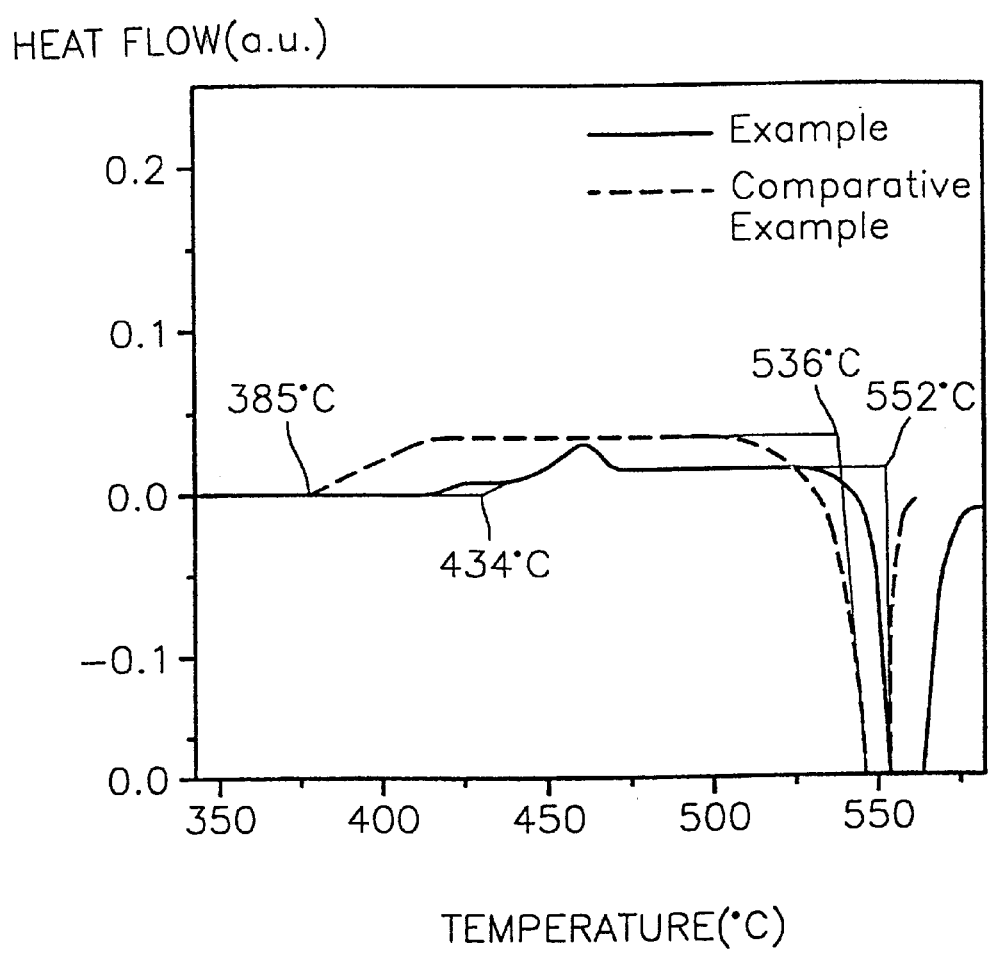
FIG. 6 is a graph showing heat flow of the optical fibers manufactured in the Example and the Comparative Example, with respect to temperature, which was measured by a differential scanning calorimeter.

FIG. 6 is a graph showing glass transition temperatures and crystallization temperatures of the optical fibers manufactured in the Example and the Comparative Example, analyzed using a differential scanning calorimeter (DSC). In general, stability to crystallization of glass is proportional to the difference (ΔT) between the crystallization temperature (Tx) and the glass transition temperature (Tg).

The ΔT of the optical fibers manufactured in the Example was 151° C., which was higher than that of the optical fibers manufactured in the Comparative Example, which was 118° C. As can be understood from the result, the optical fibers manufactured in the Example are improved in stability to crystallization of the glass, compared to the optical fibers manufactured in the Comparative Example, so that the possibility of optical loss due to crystallization which may occur in the manufacture of optical fibers can be markedly decreased.

As described above, when an optical fiber for use in a light amplifier is manufactured by doping glass with $Pr^{+3}$, as in the present invention, the fluorescence lifetime at the $^1G_4$ level and optical gain are increased, thus improving light amplification efficiency at a wavelength of 1310 nm. The glass of the present invention can be used in optical devices such as fiber sensors or mid-IR transmitting devices, and as optical glass for light amplification and fiber lasers.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An optical fiber for use in a light amplifier, which is formed by doping a germanium-gallium-sulfur (Ge—Ga—S) glass containing less sulfur than a $GeS_2$—$Ga_2S_3$ stoichiometric composition line with a rare earth element or a transition metal, further comprising 0.1~10 atomic % of a halogen element based on the Ge—Ga—S glass.

2. The optical fiber of claim 1, wherein the germanium-gallium-sulfur glass is doped with a rare earth element selected from the group consisting of praseodymium ions (Pr), ytterbium (Yb), neodymium (Nd), holmium (Ho), erbium (Er) and thulium (Tm).

3. The optical fiber of claim 1, wherein the germanium-gallium-sulfur glass is doped with a transition metal selected from the group consisting of chromium (Cr) and manganese (Mn).

4. The optical fiber of claim 1, wherein the halogen element is at least one selected from the group consisting of bromide (Br) and iodide (I).

5. The optical fiber of claim 1, wherein the amount of gallium is 1–10 mole %.

6. The optical fiber of claim 1, wherein the amount of sulfur is 60–67 mole %.

7. An optical glass, comprising:

germanium, gallium and sulfur, the mole fraction of the sulfur being less than the stoichiometric mole fraction of sulfur in the corresponding mixture of germanium sulfide and gallium sulfide; and a halogen element.

8. The optical glass of claim 7, said halogen element being selected from bromine or iodine.

9. The optical glass of claim 7, said halogen element comprising in the range of approximately 0.1 to 10 atom-% based on the germanium, gallium and sulfur.

10. The optical glass of claim 7, further comprising:

a first dopant which is a rare earth element or a transition metal, for use in optical amplification.

11. The optical glass of claim 10, said first dopant being $Pr^{+3}$.

12. The optical glass of claim 11, the molar ratios of germanium, gallium, and sulfur being approximately 32:5:62.5, the concentration of bromine being approximately 5 atom-%, and the concentration of $Pr^{+3}$ being approximately 5000 ppm.

13. The optical glass of claim 11, the mole ratios of germanium, gallium, and sulfur being approximately 28.3:10:61.7, the concentration of bromine being approximately 5 atom-%, and the concentration of $Pr^{+3}$ being approximately 5000 ppm.

14. The optical glass of claim 10, further comprising:

a second dopant selected from ytterbium, neodymium, holmium, erbium, thulium, chromium and manganese.

15. The optical glass of claim 7, the relative mole fraction of sulfur in the sulfur, germanium and gallium, being greater than 60%.

16. The optical glass of claim 7, the relative mole fraction of gallium in the sulfur, germanium and gallium, being less than 10%.

17. A light amplifier, comprising:

an optical fiber, said optical fiber being formed from an optical glass comprising:

germanium, gallium and sulfur, the mole fraction of the sulfur being less than the stoichiometric mole fraction of sulfur in the corresponding mixture of germanium sulfide and gallium sulfide;

a halogen element; and a first dopant which is a rare earth element or a transition metal.

18. The light amplifier of claim 17, further comprising:

a dispersive coupler coupled to one end of said optical fiber; and a Faraday isolator coupled to the other end of said optical fiber.

19. The light amplifier of claim 17, said first dopant being $Pr^{+3}$.

20. The light amplifier of claim 17, said halogen element being bromine.

21. The light amplifier of claim 17, said optical glass further comprising a second dopant selected from ytterbium, neodymium, holmium, erbium, thulium, chromium and manganese.

* * * * *